United States Patent Office 2,962,486
Patented Nov. 29, 1960

2,962,486

SHOCK COOLING CRYSTALLINE POLYPROPYLENE TO LOWER THE BRITTLE POINT

Thomas J. Kelly, Philadelphia, and Robert M. Kennedy, Newtown Square, Pa., assignors to Sun Oil Company, Philadelphia, Pa., a corporation of New Jersey No Drawing. Filed May 24, 1957, Ser. No. 661,295

3 Claims. (Cl. 260—93.7)

This invention relates to new compositions of matter and methods for their preparation. More particularly, the present invention relates to new solid polymers of propylene and to a method for their preparation.

Propylene has heretofore been polymerized to relatively low molecular weight liquids or soft amorphous solids through the use of polymerization catalysts such as aluminum trichloride, boron trifluoride, and the like. Propylene can be polymerized to relatively high molecular weight solid polymers by contacting propylene with a dispersion of titanium trichloride and an activator such as aluminum triethyl maintained in an inert, liquid reaction medium. Generally such processes produce polymers having molecular weights of above about 5,000 and usually within the range of from about 50,000 to 25,000. A proportion of the solid products obtained with the mentioned catalyst appears crystalline, i.e., exhibits a crystalline structure by X-ray analysis. The crystalline polymer is relatively insoluble in the usual hydrocarbon solvents, such as the paraffins, including for example, the pentanes, hexanes, octanes, decanes, and the like, even at elevated temperatures. However, the crystalline polymer can be dissolved in such solvents at relatively high temperatures, as hereinafter described. This insolubility provides a means of separating crystalline polymers from amorphous polymers of propylene which are also formed in the process, since the amorphous polymers are quite soluble in such hydrocarbons. Although the crystalline polymers of propylene, hereinafter for convenience designated "polypropylene," possess many desirable properties, they are not suitable for use in many applications because of their high brittle points. By "brittle point" is meant the temperature at which the polymer exhibits brittle failure under specific impact conditions as measured by ASTM test (D 746 52T). For example, thin films or fibers of polypropylene are not suitable in applications where flexibility is required such as for use as wrapping materials, because of cracking at temperatures encountered under usual room temperatures, or slightly below usual room temperatures. Likewise, polypropylene is not suitable for preparing fluid containers, fluid conduits, or like articles for the same reason.

Plasticizers as heretofore used with various plastic materials do not appear suitable for improving the brittle point of polypropylene because such materials lower the tensile strength and adversely affect other physical properties of the polymer, such as the melting point, melt index, and the like.

An object of the present invention is to provide a process for the preparation of polypropylene having a low brittle point. Another object is to provide a new composition of matter comprising a relatively high molecular weight polypropylene having a low brittle point. A further object is to provide a process for preparing polypropylene having a low brittle point in which other properties of the polypropylene are not adversely affected.

It has now been found that polypropylene having a low brittle point can be prepared by heating polypropylene, or a solution thereof in an inert solvent, to an elevated temperature and shock cooling the heated polypropylene, or solution thereof, so that the molten or dissolved polypropylene, i.e., the polypropylene in the fluid state, is rapidly converted to the solid phase.

In accordance with an embodiment of the invention, polypropylene is dissolved at an elevated temperature in an inert solvent which is preferably a saturated hydrocarbon. The solution is maintained at an elevated temperature until shock cooled to a temperature at which at least a major proportion of the polypropylene is converted to the solid phase. The precipitated polymer is separated and forms the polypropylene of the invention.

Saturated hydrocarbons which can be used in preparing a solution of polypropylene include the paraffins and cycloparaffins, such as the heptanes, octanes, decanes, dodecanes, cyclohexanes, decahydronaphthalene and homologues and mixtures thereof. Other solvents such as halogenated hydrocarbons, ethers, and the like, which dissolve polypropylene at an elevated temperature and precipitate the dissolved polymer at relatively low temperatures can be used, either alone or in admixture with other solvents such as the mentioned saturated hydrocarbons. Other materials such as olefins and aromatics can be present as components of such solvents in minor quantities without deleterious results. The concentration of the polypropylene dissolved in the solvent will usually be from about 2% to 15% by weight, depending on the solvent used and the temperature of dissolution. In order to dissolve the polypropylene, the solvent must be at a temperature of at least about 130° C., say from about 130° C. to 170° C., and sufficient pressure must be employed to maintain the components of the solvent in the liquid phase at the temperature employed.

By "shock cooling," and terms of similar import as used herein, is means rapid cooling so that at least a major proportion of polymer, either from the molten state or from solution, is converted to solid form in not more than 10 mintues, and preferably in not more than 7 minutes. Shock cooling a solution of polypropylene involves cooling a solution from a temperature within the range of from about 130° C. to 170° C. to a temperature of not greater than 100° C., and preferably to a temperature of below 70° C., within the time stated. Such shock cooling is conveniently accomplished by contacting a stream of the solution of polymer with a cooled metal plate, by passing the solution through a cooled metal coil, or by other means which rapidly lower the temperature of the solution so that conversion of the polypropylene to solid phase is achieved as above described.

In another embodiment of the invention, polypropylene is heated to a temperature above its melting point, say to a temperature of from about 165° C. to 185° C. The molten polypropylene is then shock cooled to rapidly convert the polypropylene to solid phase. In this embodiment the requirements of time for conversion from molten to solid phase are within the limits above stated. This embodiment is not preferred because the high viscosity of molten polypropylene makes rapid cooling thereof difficult. However, good results can be obtained in this embodiment, such as by spraying or extruding the molten polymer into a cold, inert solvent. Extrusion can be such that fibers of polypropylene are introduced into the cold solvent, wherein they are shock cooled. The fibers can be continuously removed from the solvent, dried, and stored as articles of manufacture for subsequent use.

The polymer product prepared as above described has a brittle point of not above 20° F., and brittle points of below 0° F. are frequently obtained. The low brittle point of the polymers of the invention are retained even after heating the polymer to a softening temperature and subjecting the softened polymer to molding, extrusion or other fabrication means. The remaining properties are within the limits herein-described for polypropylene, including a molecular weight of from about 5,000 to 300,000 and usually from about 25,000 to 250,000, and a melting point of from about 161° C. to 171° C.

The crystalline polypropylene used in the process of the invention is prepared by polymerizing propylene with a solid catalyst maintained as a dispersion in an inert, liquid diluent, such as n-heptane or isooctane. The solid catalyst is preferably a halide of a metal such as zirconium, chromium, vanadium, molybdenum or titanium wherein the metal is in a valence state other than its highest valence state. A lower halide of titanium such as titanium trichloride or titanium dichloride is preferred. The metal halide is used with an activator therefor such as an aluminum alkyl. For example, aluminum triethyl, aluminum triisopropyl, aluminum tri-n-propyl, or aluminum triisobutyl are suitable activators and give good results. Generally a mole ratio of activator to metal halide of 1: 1 to 12: 1 is used. Temperatures of from about 0° C. to 170° C. are suitable. Atmospheric pressure is preferably used although elevated pressures can be used to advantage in that the polymerization reaction proceeds at a faster rate at such elevated pressures, say up to about 10,000 p.s.i.g. (pounds per square inch gauge). Polypropylene is recovered from the reaction system by draining the inert, liquid reaction medium and the catalyst is deactivated and removed by contacting the polypropylene with water, alcohol or an aqueous or alcoholic solution of an inorganic acid, such as nitric acid, with vigorous agitation. Preferably such agitation provides for comminuting the catalyst during the contacting with the catalyst deactivating liquid. The polymer is then repeatedly washed to remove at least a major proportion of the residual inorganic material from the catalyst, and is then dried. The described procedure yields a product which is a mixture of crystalline and amorphous polypropylene. The amorphous polymer can be removed by dissolution in a hydrocarbon solvent at an elevated temperature below the temperature at which the crystalline polymer is dissolved as above described, for example, in n-pentane at the boiling point of n-pentane (under atmospheric pressure), or n-heptane, isooctane, tetrahydronaphthalene, decahydronaphthalene, or the like. The resulting crystalline polypropylene is then used in the process of the invention. However, a quantity of the amorphous polymer, by which is meant the polymer which is soluble in n-pentane at the boiling point of n-pentane under atmospheric pressure, say up to about 20% by weight, can be present with the crystalline polymer and good results obtained. The crystalline polypropylene will generally have a molecular weight of from about 5,000 to 300,000 and usually from about 25,000 to 250,000, a melting point of from about 161° C. to 171° C., and exhibits a crystalline structure by X-ray analysis.

In a specific embodiment of the process of the invention, the polymerization of propylene is performed, as above described, at a temperature in the upper portion of the designated range, say from about 130° C. to 150° C. The quantity of propylene introduced into the reaction mixture is regulated so that the normally solid polypropylene produced is dissolved in the reaction medium and remains in solution. After polymerization, the solid catalytic material is filtered from the reaction medium containing dissolved polypropylene. The filtrate from the filtering operation is then shock cooled, as herein described, to obtain polypropylene having a low brittle point directly from the polymerization reaction.

The following examples illustrate the preparation and polymer products of the invention. In the examples, "parts" refers to parts by weight unless otherwise indicated.

A slurry of titanium trichloride in n-heptane was prepared, about 0.07 part of titanium trichloride for each 68 parts of n-heptane being used. Aluminum triethyl was added to the slurry in a quantity such that the mole ratio thereof to titanium trichloride was 0.6: 1. The temperature of the slurry was adjusted to about 70° C. and propylene introduced to a pressure of 250 p.s.i.g. The temperature of the polymerization mixture was maintained in the range of from about 70° C. to 90° C. for about 2 hours during which time the pressure was maintained at substantially 250 p.s.i.g. by the periodic addition of propylene. Water was added to deactivate the catalyst and the resulting polymer was washed with a hot solution of 10% nitric acid in isopropyl alcohol, vigorous agitating means being used during the washing. After draining, the polymer was washed with n-pentane and dried.

The foregoing procedure was twice repeated under substantially equivalent conditions. The molecular weights of the products varied upward from about 100,000, the average molecular weight being about 111,000, and the products were blended for subsequent preparation of the polymer composition of the invention.

The polypropylene prepared as above described was dissolved in a mixture of hydrocarbons having from 8 to 12 carbon atoms per molecule, and containing a predominate quantity of hydrocarbons having 8 carbon atoms per molecule. Twenty five grams of the polymer were dissolved in 1 liter of the hydrocarbon mixture maintained in the liquid phase at 138° C. The resulting solution was then heated to about 160° C. to lower the viscosity of the solution. The solution was then rapidly contacted with a metal plate maintained at about 0° C. so that the entire solution of polypropylene was cooled to about 21° C. in a time of about 5 minutes. Polypropylene precipitated as a solid during the cooling and was filtered and solvent remaining with the polymer was evaporated.

The resulting polymer product was heated to its softening point (about 149° C.) and was molded into a thin strip under a pressure of 10,000 p.s.i.g. The brittle point of the resulting polymer was 15° F. The brittle point of the polymer product prepared as above described, but which was not rapidly cooled, was above 50° F. Other properties, including hardness, melting point and molecular weight were substantially unchanged.

The polypropylene products of the present invention are characterized by low brittle points and are useful in many applications such as in preparing thin films for wrapping materials, for use as fluid containers or fluid conduits and the like, especially when such articles are to be subjected to relatively low temperatures.

The invention claimed is:

1. Process for lowering the brittle point of predominately crystalline polypropylene which has been prepared by contacting propylene with a titanium halide-aluminum alkyl catalyst system which comprises dissolving said polypropylene in an inert solvent consisting essentially of saturated hydrocarbons at a temperature of from about 130° C. to 170° C., cooling the resulting solution to a temperature of below 70° C. in a time of not more than 10 minutes, and recovering polypropylene having a brittle point below that of the starting material from the resulting slurry.

2. Process for lowering the brittle point or predominately crystalline polypropylene which has been prepared by contacting propylene with a titanium halide-aluminum alkyl catalyst system which comprises heating said polypropylene to a temperature above its melting point and shock cooling the molten polypropylene from a temperature within the range of from about 130° C. to 170° C. to a temperature not greater than 100° C. within a time of not more than 10 minutes to solid phase.

3. Process for lowering the brittle point of predominately crystalline polypropylene which has been prepared by contacting propylene with a titanium halide-aluminum alkyl catalyst system which comprises heating said polypropylene to a temperature above its melting point, introducing the molten polypropylene to a cold, inert solvent, thereby to reduce the temperature to below 70° F. in a time of not more than 7 minutes and recovering solid polypropylene having a brittle point below that of the starting material from the inert solvent.

References Cited in the file of this patent

UNITED STATES PATENTS

| | | |
|---|---|---|
| 2,702,288 | Hoeksema et al. | Feb. 15, 1955 |
| 2,880,201 | Peters et al. | Mar. 31, 1959 |

FOREIGN PATENTS

| | | |
|---|---|---|
| 538,782 | Belgium | Dec. 6, 1955 |

OTHER REFERENCES

Richards: Journal of Applied Chem., vol. 1, p. 376, August 1951.